United States Patent [19]

Klema

[11] Patent Number: 4,775,826

[45] Date of Patent: Oct. 4, 1988

[54] BATTERY SYSTEM FOR AUXILIARY AIRCRAFT POWER

[75] Inventor: Gordon L. Klema, Racine, Wis.

[73] Assignee: Aviation Ignition Accessories, Milwaukee, Wis.

[21] Appl. No.: 43,001

[22] Filed: Apr. 27, 1987

[51] Int. Cl.[4] .................... H02J 7/00

[52] U.S. Cl. .................... 320/2; 320/3; 320/15

[58] Field of Search .................... 320/2, 3, 20, 15; 323/906

[56] References Cited

U.S. PATENT DOCUMENTS

| | | | |
|---|---|---|---|
| 4,311,952 | 1/1982 | Mabuchi et al. | 320/3 |
| 4,422,031 | 12/1983 | Vigerstol | 320/2 |
| 4,667,141 | 5/1987 | Steele | 320/2 |
| 4,670,700 | 6/1987 | Henkel | 320/3 X |

FOREIGN PATENT DOCUMENTS

| | | | |
|---|---|---|---|
| 0604094 | 6/1948 | United Kingdom | 323/906 |
| 2120473 | 11/1983 | United Kingdom | 320/20 |

*Primary Examiner*—R. J. Hickey

*Attorney, Agent, or Firm*—Quarles & Brady

[57] ABSTRACT

A battery system for auxiliary aircraft power includes a 30 volt battery pack consisting of two twelve volt batteries and one six volt battery connected in series. A constant voltage device is connected in series with the battery pack to reduce the higher batter pack voltage to the nominal 28 volts required by the aircraft. In this way, commonly available industrial batteries can be used to supply the 28 volts peculiar to aircraft systems. The constant voltage device comprises two pairs of series connected silicon power diodes, each pair of series connected diodes exhibiting a forward voltage drop under load of approximately 1.5 volts. The two pairs of diodes are connected in parallel to increase the current carrying capacity of the constant voltage device.

9 Claims, 1 Drawing Sheet

BATTERY SYSTEM FOR AUXILIARY AIRCRAFT POWER

BACKGROUND OF THE INVENTION

The field of the invention is auxiliary battery systems for supplying 28 volts Direct Current (DC) power to aircraft.

Direct current (DC) power systems on small and medium sized aircraft are typically 12, 24, or 28 volts. An on-board battery of the corresponding voltage is used in the aircraft for starting and emergency power. During ground maintenance operations, it is desirable to supply an auxiliary source of power so that the on-board batteries are not depleted. On medium sized aircraft, for example twin engine aircraft and small business jets, a receptacle is provided for this purpose.

The auxiliary source of power may be either an engine generator set or battery pack. Using a battery pack is preferred in most small to medium sized applications because of low maintenance requirements and freedom from noise and vibration. The battery pack is usually composed of several cells or batteries of lower voltages externally connected in series to achieve the desired voltage for the battery pack.

For 12 and 24 volt systems, commercial batteries are readily available as these voltages are commonly used in automotive, truck and other industrial applications. Prior battery packs for 28 volt auxiliary aircraft power, however, were usually composed of a bank of fourteen lead acid cells of 2 volts each. Such battery packs are generally acceptable, but are relatively expensive, owing to limited availability of individual 2 volt cells and the additional wiring needed to connect them together.

Additionally, chargers for the prior 28 volt battery packs also have limited availability, since they have applicability only to aircraft systems, are relatively expensive, and are predominantly of the trickle charge variety as opposed to automatic shutdown type chargers. Chargers of the automatic shutdown type are preferred in those applications of battery packs for supplying auxiliary aircraft power were used of the battery pack is sporadic. Under those circumstances, it is desirable to charge the battery pack fully at a normal rate and then to have the charger shut down until manually restarted, which is exactly the operation provided by an automatic shutdown type charger. Using trickle chargers in such applications may damage the battery pack if left unattended for long periods by overcharging the battery pack or causing excessive loss of electrolyte.

SUMMARY OF THE INVENTION

In a battery system of the present invention, a battery pack is used with a nominal voltage higher than the 28 volts required by aircraft auxiliary power system. A constant voltage device is connected in series with the battery pack to reduce the higher battery pack voltage to the nominal 28 volts required by the aircraft auxiliary power system.

A principal advantage of this invention is that the nominal voltage of the battery pack does not need to be exactly 28 volts, but can be a higher voltage. This allows the battery pack to be constructed from low cost, commonly available industrial batteries.

The battery pack may be comprised of two twelve volt batteries and one six volt battery connected in series, yielding a nominal voltage for the battery pack of 30 volts. The constant voltage device may be a pair of series connected silicon power diodes, yielding a forward biased voltage drop of approximately 1.5 volts, thereby reducing the 30 volts from the battery pack to within the nominal voltage range required for the 28 volt auxiliary power system.

Another advantage of this invention is that the combination of the battery pack nominal voltage and the voltage drop of the constant voltage device may be selected to achieve a voltage delivered to the aircraft slightly higher than 28 volts, for example 28.5 volts, but still within the nominal range required by the auxiliary power system. This allows the voltage of the battery pack to droop somewhat during discharge while maintaining the voltage delivered to the aircraft within nominal limits.

Still another advantage of this invention is that using diodes as the constant voltage device prevents any current from feeding back from the aircraft auxiliary power system to the battery pack.

Yet another advantage of this invention is that because the battery pack can be constructed to have a nominal voltage in widespread industrial use, for example 30 volts, battery chargers of the automatic shutdown type for charging the battery pack are readily available at a lower cost than specialized 28 volt aircraft battery chargers.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
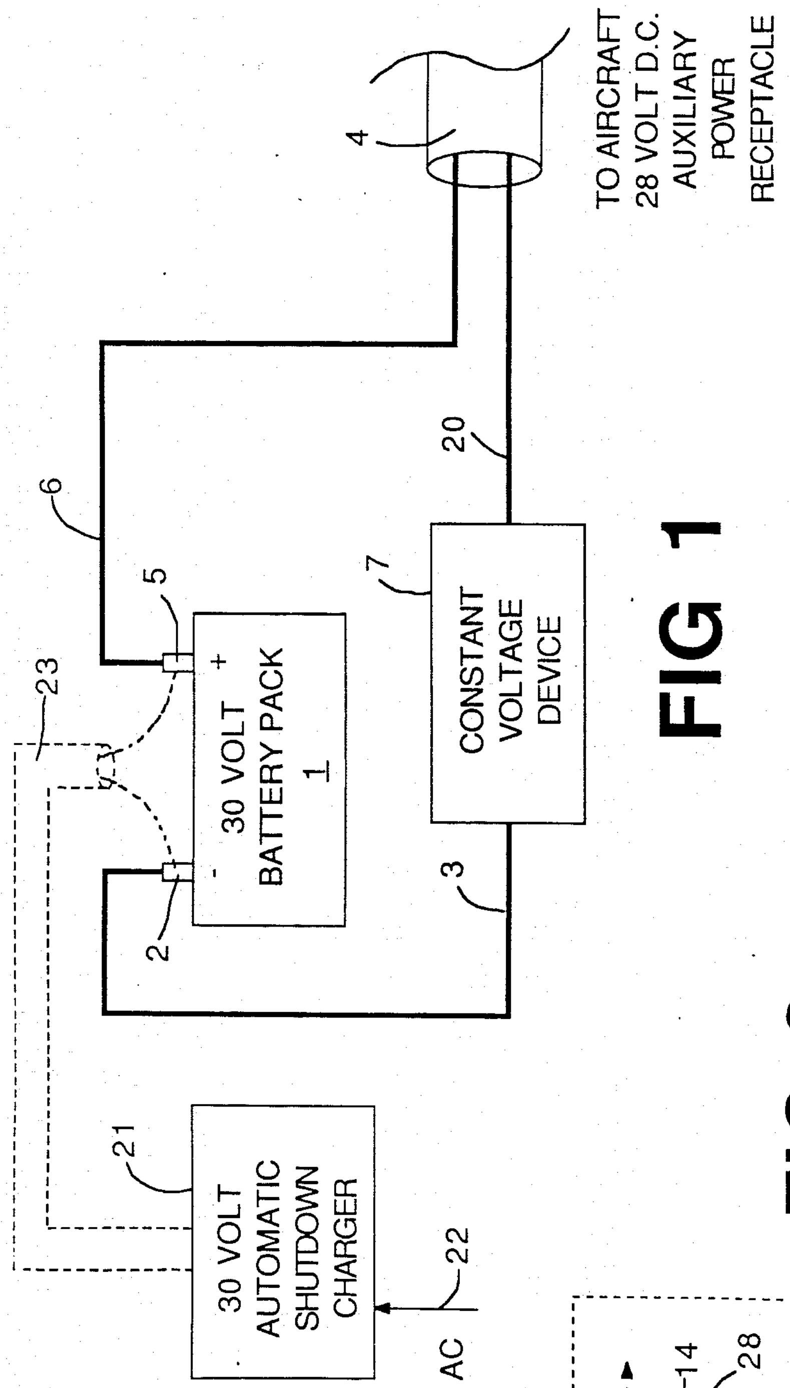
FIG. 1 is a block diagram of a battery system for auxiliary aircraft power of the present invention.

Referring to FIG. 1, a 30 volt battery pack 1 is used to supply auxiliary power for an aircraft 28 volt system. The positive terminal 5 of the battery pack 1 connects to the positive lead 6 of a cable 4 which leads to a receptacle suitable for connection to the 28 volt Direct Current (DC) input power receptacle of an aircraft (not shown). The negative terminal 2 of the battery pack 1 is connected through a wire 3 to the input of a constant voltage device 7.

Figure 2:
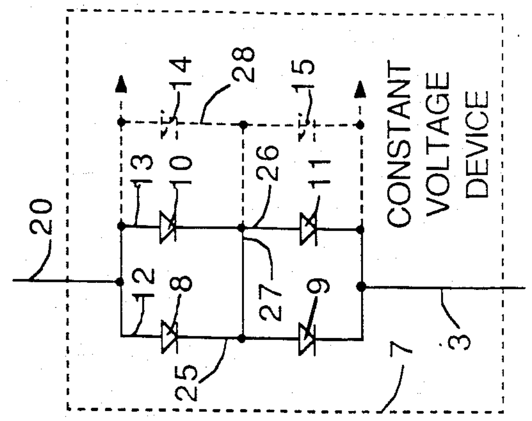
FIG. 2 is a schematic diagram of a constant voltage device which forms a part of the auxiliary power system of FIG. 1.

The constant voltage device 7 has a characteristic that the voltage drop across the device 7 is an approximately constant voltage, regardless of the magnitude of the current through the device 7. Referring to FIG. 2, in this embodiment, the constant voltage device 7 is constructed using silicon power diodes 8–11. The diodes 8–11 are connected in a series parallel arrangement to form two parallel branches 12–13 with 2 series connected diodes 8–9 and 10–11 in each branch 12–13, respectively. The center leads 25 and 26 of each series connected diode repair are bridged by conductor 27 so that in the event that one of the diodes 8–11 should fail open, the constant voltage device 7 would continue to operate.

In this arrangement, the voltage drop across each branch 12 and 13 will be approximately 1.5 volts under load. Each of the diodes 8–11 is a silicon power diode, exhibiting a forward voltage drop of approximately 0.75 volts, with little voltage variation over a wide current range, and capable of conducting very large currents. The particular devices preferred for this embodiment are 300 amp, 50 volt diodes, type 300U5A, manufactured by International Rectifier, Inc.. These 300 amp devices have been found to be suitable even though surge currents of much higher amperage, for example during starting of the aircraft engines, can exist for brief periods of time.

The use of diodes 8–11 as the constant voltage device 7 has the additional advantage over connecting a 28 volt battery pack directly that the diodes 8–11 prevent any current from being fed back from the aircraft auxiliary power system to the battery pack 1.

Paralleling of branches 12 and 13 increases the current carrying capacity over that of a single branch. To achieve an even greater current carrying capability, additional pairs of series connected diodes 14 and 15, represented by dotted lines in FIG. 2, may be connected in parallel with branches 12 and 13. Conductor 27 may then be extended to center lead 28 between diodes 14 and 15. The above described redundancy would then apply to all six diodes 8–11 and 14–15, so that if any one diode fails open, at least two parallel diodes remain to share the current.

The diodes 8–11 are mounted on a heat sink (not shown) to provide adequate cooling. The normal wiring among the diodes 8–11 and the branches 12 and 13 introduces a sufficient amount of resistance to ensure adequate load sharing among the branches 12 and 13 to prevent thermal runaway of any one diode 8–11.

It should be apparent to one skilled in the art that the constant voltage device 7 can be constructed to achieve other voltages and may be constructed with other than silicon diodes and even with devices other than diodes. For example, additional series silicon diodes (not shown) could be placed in each branch 12 and 13 to achieve a higher voltage drop, and series diodes 8 and 10 could be removed to provide a lower voltage drop. Also, power diodes of types other than silicon with different characteristic forward voltage drops may be used, for example, Shottky diodes having a forward voltage drop of approximately 0.4 volts. Arrangements of such diodes may even be provided with taps (not shown), or switched, to produce a voltage drop which could be adjusted for different conditions of the battery pack 1 or load. Similarly, the diodes could be replaced altogether with other solid state devices such as, for example, power bipolar or MOSFET transistors driven by voltage regulating circuitry as is well known in the art to achieve a constant voltage across the transistors terminals.

Referring again to FIG. 1 the output of the constant voltage device 7 is connected to the negative lead 20 of the cable 4. Because of the constant voltage drop of approximately 1.5 volts across the device 7, the voltage on the cable 4 being applied to the aircraft is therefore approximately 28.5 volts. This 28.5 volts is suitable for use on the 28 volt nominal aircraft systems. This invention provides a significant advantage over a 28 volt battery system because the 28.5 volt output allows for a greater amount of sag of the voltage on the battery pack 1 while keeping the output to the aircraft within the 28 volt nominal limits.

The battery pack 1 and constant voltage device 7 are housed together in a mobile cart (not shown) which may be easily transported to the aircraft for connection. The battery pack 1 is constructed using industrial deep-cycle lead acid batteries (not shown), with two 12 volt batteries and one 6 volt battery connected in series. A principal advantage of this invention is that by allowing a 30 volt battery pack 1 to be used to supply auxiliary power to a 28 volt aircraft power system, readily available industrial batteries of standard voltages, for example, 6, 12 and 24 volts, can be utilized. Prior battery packs for aircraft applications were constructed of 28 volt battery assemblies, usually consisting of a series of 14 two volt lead acid cells. Such two volt cells were more expensive, more difficult to obtain, and required additional wiring to interconnect the many cells.

It should be appreciated by one skilled in the art that a second bank of batteries could be connected in parallel with the two 12 volt and one 6 volt batteries to achieve a 30 volt battery pack 1 with a greater amp-hour capacity. It should be similarly apparent that other combinations of commonly available 6, 12 and 24 volt batteries can be constructed to arrive at 30 volts, for example five six volt batteries or one 24 volt battery and one six volt battery. Further, any voltage higher than 28 volts may be used, for example, 36 volts, with a corresponding change in the voltage dropped by the constant voltage device.

When the battery pack 1 is not in use, it is connected to a 30 volt automatic shut down charger 21 to restore the charge on the battery pack 1. The charger 21 operates on a 120 volt alternating current (AC) input 22 and may be connected to the battery pack 1 by any suitable means such as, for example, a receptacle (not shown) on the mobile cart. Alternatively, the charger 21 may be connected directly to the battery terminals 2 and 5 with a pair of clips (not shown) on the ends of a cable 23 admitted through an access panel (not shown) on the mobile cart.

A charger of the automatic shut-down type is preferred as the charger 21 because the battery pack 1 may be used only sporadically. The automatic shut-down charger 21 charges the battery pack 1 by monitoring the voltage of the charging battery pack 1. When the charging voltage reaches a preset threshold indicating that the battery pack 1 is fully charged, the charger 21 shuts itself off. Under such conditions of sporadic use, the battery pack 1 may be charged unattended. In that case, the charger 1 shuts off automatically after the charge is complete, with no further draw of electrical power and with no danger of overcharging or causing excessive boil-off of the electrolyte in the battery pack 1. Conversely, trickle chargers are particularly ill suited for this application because they draw power continuously and must be monitored to ensure that they do not overcharge the battery pack 1 or cause excessive boil off of the electrolyte.

Another important advantage of this invention is that a 30 volt automatic shut down charger is a common industrial unit available at low cost from many sources. The particular model used in this enbodiment is model 8892-99W/6575ET manufactured by Lester Electrical Company, Inc. In opposition, battery chargers for 28 volt batteries are highly specialized, being limited to aircraft applications, and are almost exclusively of the trickle charge variety. The result of using a 30 volt system for the battery pack 1 and the charger 21 is a highly economical system which can be assembled and maintained at a much lower cost than prior 28 volt battery systems.

I claim:

1. A system for supplying 28 volt DC auxiliary power to an auxiliary power input receptacle of an aircraft comprising;

a battery pack comprised of a plurality of series connected batteries, each battery being comprised of a plurality of internally connected cells and each battery having a nominal voltage of at least six volts, the battery pack having a nominal voltage higher than 28 volts;

a constant voltage device connected in series between one terminal of the battery pack and one lead of the receptacle, the constant voltage device thereby reducing the voltage delivered to the receptacle by the battery pack to within the nominal limits required for the 28 volt DC aircraft system.

2. The system of claim 1 in which the battery pack has a nominal voltage of 30 volts.

3. The system of claim 2 in which the battery pack comprises two twelve volt batteries and one six volt battery connected in series.

4. The systemm of claim 2 in which the constant voltage device comprises a first pair of silicon power diodes connected in series between the input and output terminals of the constant voltage device with both diodes being forward biased for conducting current from the battery pack to the aircraft receptacle.

5. The system of claim 4 in which the constant voltage device includes a second pair of series connected diodes, the second pair of diodes being connected in parallel with the first pair of diodes to increase the current carrying capacity of the constant voltage device.

6. The system of claim 5 in which the constant voltage device further includes one or more additional pairs of series connected silicon power diodes connected in parallel with the first and second pairs of diodes to further increase the current carrying capacity of the constant voltage device.

7. The system of claim 1 which includes a mobile cart which houses the battery pack and constant voltage device for transportation to the site of the aircraft to be serviced.

8. The system of claim 1 which includes a battery charger of the automatic shutdown type for a voltage corresponding to the voltage of the battery pack.

9. In a battery system for supplying 28 volt DC auxiliary power to an auxiliary power input receptacle of an aircraft, the receptacle including two leads for the connection of 28 volt DC power, the improvement wherein:

the battery pack comprises of a plurality of series connected batteries, each battery being comprised of a plurality of internally connected cells and each battery having a nominal voltage of at least six volts, the battery pack having a nominal voltage higher than 28 volts; and a constant voltage device is connected in series between one terminal of the battery pack and one lead of the receptacle, the constant voltage device thereby reducing the voltage delivered to the receptacle by the battery pack to within the nominal limits required for the 28 volt DC aircraft system.

* * * * *